(12) United States Patent
Yang et al.

(10) Patent No.: US 9,288,470 B2
(45) Date of Patent: Mar. 15, 2016

(54) 3D IMAGE SIGNAL TRANSMISSION METHOD, 3D IMAGE DISPLAY APPARATUS AND SIGNAL PROCESSING METHOD THEREIN

(75) Inventors: Jeong-Hyu Yang, Seoul (KR); Jong-Yeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 880 days.

(21) Appl. No.: 13/132,239

(22) PCT Filed: Aug. 19, 2009

(86) PCT No.: PCT/KR2009/004619
§ 371 (c)(1),
(2), (4) Date: Jun. 1, 2011

(87) PCT Pub. No.: WO2010/064774
PCT Pub. Date: Jun. 10, 2010

(65) Prior Publication Data
US 2011/0234760 A1   Sep. 29, 2011

Related U.S. Application Data

(60) Provisional application No. 61/119,359, filed on Dec. 2, 2008.

(51) Int. Cl.
*H04N 13/00* (2006.01)
*H04N 21/236* (2011.01)
*H04N 21/434* (2011.01)
*H04N 21/84* (2011.01)
*H04N 19/597* (2014.01)

(52) U.S. Cl.
CPC ......... *H04N 13/0059* (2013.01); *H04N 13/007* (2013.01); *H04N 13/0048* (2013.01); *H04N 13/0066* (2013.01); *H04N 19/597* (2013.01); *H04N 21/23614* (2013.01); *H04N 21/4348* (2013.01); *H04N 21/84* (2013.01)

(58) Field of Classification Search
CPC .............................. H04N 13/00; H04N 19/007
See application file for complete search history.

(56) References Cited

U.S. PATENT DOCUMENTS

| | | | |
|---|---|---|---|
| 6,359,658 B1 * | 3/2002 | He | H04N 17/00 324/613 |
| 2002/0141635 A1 * | 10/2002 | Swift et al. | 382/154 |

(Continued)

FOREIGN PATENT DOCUMENTS

| | | |
|---|---|---|
| JP | 2008-47983 A | 2/2008 |
| KR | 10-2008-0039797 A | 5/2008 |
| WO | 2008/139351 A1 | 11/2008 |

*Primary Examiner* — Geepy Pe
*Assistant Examiner* — Joseph Becker
(74) *Attorney, Agent, or Firm* — Dentons US LLP

(57) ABSTRACT

A method for transmitting a 3D image signal an image display device, and an image signal processing method of the device are provided in order to reduce a collision between depth cues, which may occur in the vicinity of left and right corners in reproducing a 3D image. In the method for processing an image signal, first, an encoded video signal is obtained. Next, the encoded video signal is decoded to restore a plurality of image signals, and floating window information of each floating window is extracted from a picture header area of the encoded video signal. And then, an image at an inner area of left or right corner is suppressed according to the floating window information with respect to each of the plurality of images corresponding to the plurality of image signals, and the locally suppressed images are displayed in a stereoscopic manner.

13 Claims, 13 Drawing Sheets

(56) References Cited

U.S. PATENT DOCUMENTS

| | | |
|---|---|---|
| 2006/0133493 A1 | 6/2006 | Cho et al. |
| 2008/0177994 A1* | 7/2008 | Mayer ............... G06F 9/4418 713/2 |
| 2009/0136145 A1* | 5/2009 | Morimoto et al. ............ 382/233 |
| 2010/0091097 A1* | 4/2010 | Pockett ......................... 348/54 |
| 2010/0220920 A1* | 9/2010 | Barenbrug .................... 382/154 |
| 2010/0220978 A1* | 9/2010 | Ogikubo ............ G06F 3/04815 715/716 |

* cited by examiner

FIG.5
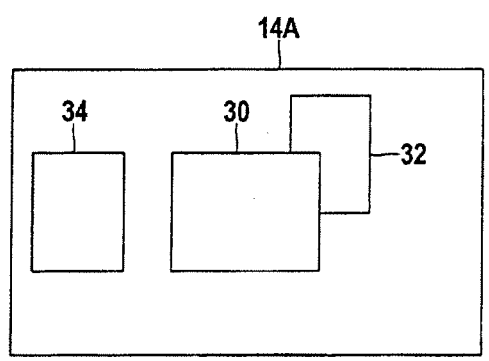
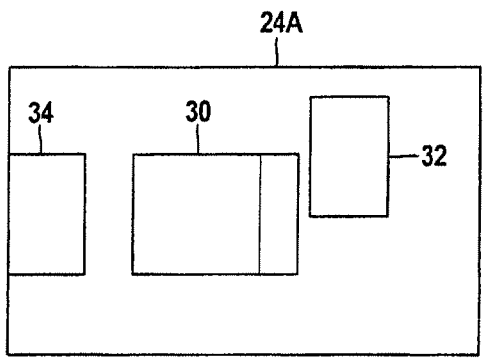

FIG.10

| Syntax | No. of bits | Format |
|---|---|---|
| fw_data() { | | |
|     left_view_left_float_window_flag | 1 | bslbf |
|     left_view_right_float_window_flag | 1 | bslbf |
|     right_view_left_float_window_flag | 1 | bslbf |
|     right_view_right_float_window_flag | 1 | bslbf |
|     reserved | 4 | '1111' |
|     if (left_view_left_float_window_flag == '1') { | | |
|         marker_bits | 2 | '11' |
|         number_pixels_of_LL_window | 14 | uimsbf |
|         if (number_pixels_of_LL_window != 0 ) { | | |
|             transparency_LL_window | 8 | uimsbf |
|             color_LL_window | 24 | uimsbf |
|         } | | |
|     } | | |
|     if (left_view_right_float_window_flag == '1') { | | |
|         marker_bits | 2 | '11' |
|         number_pixels_of_LR_window | 14 | uimsbf |
|         if (number_pixels_of_LR_window != 0 ) { | | |
|             transparency_LR_window | 8 | uimsbf |
|             color_LR_window | 24 | uimsbf |
|         } | | |
|     } | | |
|     if (right_view_left_float_window_flag == '1') { | | |
|         marker_bits | 2 | '11' |
|         number_pixels_of_RL_window | 14 | uimsbf |
|         if (number_pixels_of_RL_window != 0 ) { | | |
|             transparency_RL_window | 8 | uimsbf |
|             color_RL_window | 24 | uimsbf |
|         } | | |
|     } | | |
|     if (right_view_right_float_window_flag == '1') { | | |
|         marker_bits | 2 | '11' |
|         number_pixels_of_RR_window | 14 | uimsbf |
|         if (number_pixels_of_RR_window != 0 ) { | | |
|             transparency_RR_window | 8 | uimsbf |
|             color_RR_window | 24 | uimsbf |
|         } | | |
|     } | | |
| } | | |

FIG.11

| Syntax | No. of bits | Format |
|---|---|---|
| user_data_registered_itu_t_t35( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | |

# 3D IMAGE SIGNAL TRANSMISSION METHOD, 3D IMAGE DISPLAY APPARATUS AND SIGNAL PROCESSING METHOD THEREIN

This application claims the benefit of priority of U.S. Provisional Application No. 61/119,359 filed on Dec. 2, 2008 and PCT Application No. PCT/KR2009/004619 filed on Aug. 19, 2009, all of which are incorporated by reference in their entirety herein.

TECHNICAL FIELD

The present invention relates to a method for encoding image signals and, more particularly, to a method for encoding stereoscopic image signals for implementing 3D images. In addition, the present invention relates to an image display device and signal processing thereof. In particular, the present invention relates to a stereoscopic display device implementing 3D images, and a method for processing stereoscopic image signals in the stereoscopic display device.

BACKGROUND ART

A human being's vision system recognizes relative positions of objects in visible space by using a great deal of depth cues. Such cues may be classified into two categories, namely, a physiological factor and a psychological factor. The physiological depth cues include accommodation, convergence or vergence, binocular disparity, and motion parallax, while the psychological depth cues include linear perspective, shade, atmospheric perspective, occlusion by a different object, texture gradient, and color.

Among the physiological depth cues, accommodation refers to changing a focal length of a crystalline lens when a viewer's eyes are to be focused on a particular area of a three-dimensional (3D) scene. The change in the thickness of the crystalline lens is generated due to a change in the tension of muscle of a ciliary body. In the human being's vision system, it is normal to use accommodation in conjunction with convergence. Convergence or vergence refers to a phenomenon whereby when a viewer (or an observer) gazes at a point at a finite distance, his two eyes rotate inward and cross at a fixation point. Binocular disparity, based on the fact that left and right eyes are separated by about 65 millimeters from each other and receives different images, refers to the difference between images projected to the left and right retinas when the viewer is viewing a 3D scene. The binocular disparity is definite depth cue used in depth sensing or stereopsis by the vision system. Motion parallax refers to a relative displacement difference of respective points in the 3D scene (namely, a closer point moves more actively than a distant point) when there is a relative motion between the observer and the 3D scene.

Research into a 3D television has been actively conducted in order to display a 3D image by utilizing such a visual perceptual mechanism of human beings. Various 3D image display schemes have been proposed, and the most prominent one among them, in terms of technical feasibility and 3D effect display capability at the time of filing the present application may be the stereoscopic scheme. In a stereoscopic 3D display system, different images are captured by using two image sensors separated by about 65 millimeters from each other like human eyes, and a display device allows the two images be separately provided to the user's left and right eyes, to thereby simulate the binocular disparity to allow for depth perception or stereoscopic vision (or stereopsis). Two image sensors are aligned in a horizontal direction such that they have the same optical characteristics, focal length, and zoom magnification.

However, the stereoscopic 3D image is different in some aspects from an image a human can actually perceive.

One difference is the discrepancy in focusing and convergence. In more detail, when a human actually gazes at a certain object, both eyes are converged to a fixation point on the gazed object and focus on the fixation point. In comparison, when he views a stereoscopic image, a different situation occurs. A camera capturing an image focuses on a particular object, and accordingly, the focus of a pair of two stereoscopic images is adjusted on the basis of a virtual stereoscopic window plane on which the object is positioned. When displayed on the display device, the pair of stereoscopic images is focused on a physical image display plane (referred to as a 'stereoscopic screen', hereinafter). Accordingly, a convergence stimulus naturally changes over the depth, while a focusing stimulus has a tendency of maintaining a state of being fixed to the stereoscopic screen.

Thus, the human's eyes constantly focus on the stereoscopic screen, while the fixation point is at the front or rear of the stereoscopic screen depending on the position of the gazed object, causing a situation in which the human eyes are converged to a depth plane different from the stereoscopic screen. Also, although the pair of stereoscopic images is produced to be focused on the basis of points on the stereoscopic screen, some humans' eyes attempt focusing on an object, as a fixation point, in front of or behind the stereoscopic screen, to which the focus is not precisely adjusted.

Humans may tolerate a slight focusing-convergence discrepancy, but if this is excessively increased, an image is not focused or stereo image synthesizing is not properly performed. In more detail, as shown in FIG. 1, when the fixation point is positioned on the stereoscopic screen and is consistent with points ($P_L$, $P_R$) corresponding to a left image and a right image, the horizontal parallax is 0 and cues do not collide. As shown in FIG. 2, when the fixation point is positioned behind the stereoscopic screen, the horizontal parallax has a positive value, so in this case, although the cues slightly collide, stereoscopic images can be synthesized to have a stereoscopic depth effect by the binocular disparity without causing great tension. Meanwhile, as shown in FIG. 3, when the fixation point is positioned in front of the stereoscopic image, the horizontal parallax has a negative value and the human vision cross in front of the screen, causing considerable tension in the eyes. The human eyes can tolerate a negative parallax value to an extent and merge the pair of stereoscopic images, but when the negative parallax value exceeds a certain value, it is known that the image collapses or is seen as two images, making the viewer feel uncomfortable.

As a more serious problem, among those caused by the negative parallax, is a collision between cues may occur when the object having a negative parallax value is partially covered in the vicinity of left and right corners of the pair of stereoscopic images.

FIG. 4 shows a situation in which a first camera having a lens 10 and an image sensor 12 captures a left image projected to a first stereoscopic window 14 and a second camera having a lens 20 and an image sensor 22 captures a right image projected to the second stereoscopic window 24. It is assumed that first to third objects 30, 32 and 34 are included on the first and second stereoscopic windows 14 and 24. FIG. 5 shows an example of left and right images 14a and 24a displayed on the stereoscopic plane. The left and right images may be synthesized to have a stereoscopic depth effect by binocular parallax to display first and second objects 30 and 32, each having a zero parallax and a positive parallax. The two images may be synthesized by the stereoscopic cues to provide a stereoscopic image of the third object 34 having a negative parallax to the observer (or viewer). However, as the third object 34 is cut by the left corner of the right image, another depth cue called 'occlusion by an object' takes effect, and accordingly, the user may recognize as if the object was positioned behind the stereoscopic plane, namely, the display device.

Such a collision of cues is called 'edge violation', which causes viewer inconvenience and confusion and potentially significantly degrades the quality of the 3D image. The collision of cues caused by the object's partial occlusion may partially result from a partial blind spot generated as the second camera fails to cover the left portion of the viewing angle of the first camera. Meanwhile, the same problem also arises when the object is covered (occluded) by the corner of the right image.

DISCLOSURE OF THE INVENTION

Therefore, an object of the present invention is to provide a method for transmitting a 3D image signal capable of reducing a collision between depth cues potentially generated in the vicinity of left and right corners of a 3D image when a receiver positioned at a remote area displays a plurality of images to implement a 3D image.

Another object of the present invention is to provide an image display device capable of reducing a collision between depth cues potentially generated in the vicinity of left and right corners of a 3D image in displaying a plurality of images to implement a 3D image.

Another object of the present invention is to provide a method for processing an image signal capable of reducing a collision between depth cues potentially generated in the vicinity of left and right corners of a 3D image in displaying a plurality of images to implement a 3D image.

In order to achieve the above objects, in a method for transmitting a 3D image signal, first, a plurality of video signals each indicating a plurality of images having different viewpoints are prepared. Subsequently, floating window information including a field indicating whether to apply at least one floating window, the position and size of each floating window, and transparency and color of each floating window may be generated. And then, after the floating window information may be inserted into a video picture header area, the video signal is encoded and transmitted.

The floating window may be an area set at an inner side of a left or right corner of each of the plurality of images, where an expression of an image obtained from a broadcast signal is suppressed, in the process of reproducing an image, and in this case, the size of each floating window is individually determined. In the present disclosure including claims, the term of 'suppression' may be used to have a meaning including a case in which an image of a corresponding area is alpha-blended with particular color and a particular transparency value so as to be shaded (namely, the image is vaguely displayed), as well as a case in which an image of a corresponding area is completely invalidated and replaced with particular color.

In an exemplary embodiment, the size of each flowing window may be determined on the basis of a camera parameter of an image sensor which has captured the image, the displacement between corresponding points in the plurality of images, or the combination of the camera parameter and the displacement.

The present invention defines a syntax and a data structure for including floating window information in a picture header of an encoded image signal as meta data and transmitting the same, and defines a method for interpreting the floating window information and reflecting it on a screen at the receiver's side. In this relation, according to an exemplary embodiment of the present invention, the data structure may be generated by including the floating window information and a second field having a value corresponding to the floating window information. Subsequently, a user data structure may be generated by including the data structure and a first field having a certain value. In an exemplary embodiment for encoding an image signal according to ATSC digital television standard of A/53 Part 4 and the MPEG-2 standard of ISO/IEC 13818-2, the second field is a 'user_data_type_code' and indicates floating window information by a value of "0x09". Also, in this exemplary embodiment, the first field is a 'user_data_identifier' field and may have a value of "0x4741 3934" with respect to the data structure including the floating window information. The thusly generated user data structure may be inserted into the picture header.

In order to achieve the above objects, there is also provided an image display device including a decoding unit and a synthesizing/display unit. The decoding unit may decode an encoded video signal to restore a plurality of image signals and extract floating window information from a picture header area of the encoded video signal. With respect to each of the plurality of images corresponding to the plurality of image signals, the synthesizing/displaying unit may suppress an image at an inner area of the left corner and/or right corner according to the floating window information, and display the locally suppressed images in a stereoscopic manner.

The floating window information may include the position and size of each floating window, transparency, and color data.

In an exemplary embodiment of the present invention, the plurality of image signals may include a left image signal with respect to a left image and a right image signal with respect to a right image.

In an exemplary embodiment of the present invention, the synthesizing/displaying unit may include an on screen display (OSD) generation unit, first and second mixing units, and a formatter. The OSD generation unit may generate a left floating window image signal and a right floating window image signal according to the position and size data and the color data. The first and second mixing units may synthesize the left image signal and the left floating window image signal, and synthesize the right image signal and the right floating window image signal. The formatter may format output signals from the first and second mixing units according to a stereoscopic output scheme.

In a different exemplary embodiment of the present invention, the synthesizing/display unit may include a first formatter, an OSD generation unit, a second formatter, and a mixing unit. The first formatter may format the left image signal and the right image signal according to the stereoscopic output scheme. The OSD generation unit may generate a left floating window image signal and a right floating window image signal according to the position and size data and the color data. The second formatter may format the left floating window image signal and the right floating window image signal according to the stereoscopic output scheme. The mixing unit may synthesize output signals from the first and second formatters.

In an exemplary embodiment of the present invention, the image display device may be implemented in the form of a 3D television receiver. In the 3D television receiver, a tuner/ demodulator may receive a broadcast signal through a certain channel, demodulate it, and output a channel-coded transport stream.

A channel decoder may receive the channel-coded transport stream (TS), perform error-correction-decoding on the TS, and output a decoded transport stream. A demultiplexer/depacketizer may demultiplex the decoded transport stream and depacketize to output the coded video signal.

In order to achieve the above objects, in a method for processing an image signal, first an encoded video signal may be obtained. Subsequently, the encoded video signal is decoded to restore a plurality of image signals, and floating window information of each floating window may be extracted from a picture header area of the encoded video signal. Thereafter, with respect to each of the plurality of images corresponding to the plurality of image signals, an image at an inner area of the left corner and/or right corner may be suppressed according to the floating window information, and locally suppressed images may be displayed in a stereoscopic manner.

In extracting the floating window information, first, the picture header may be extracted from the encoded video signal. Next, user data structure in which a first field has a certain value may be extracted from the picture header. A data structure in which a second field has a value indicating the floating window in the user data structure may be extracted as the floating window information. In an exemplary embodiment of the present invention in which an image signal is encoded according to the ATSC digital television standard of A/53 Part 4 and the MPEG-2 standard of ISO/IEC 13818-2, the first field may be a 'user_data_identifier' field, and a user data structure in which this field has a value of "0x4741 3934" may be extracted as a data structure including floating window information. Also, the second field may be a 'user_data_type_code' field, and a data structure in which this field has a value of "0x09" may be extracted as floating window information.

In an exemplary embodiment of the present invention, in processing the floating window, a floating window may be set at an inner area of at least any one of left and right corners of each of the plurality of images according to position and size data, an image portion corresponding to the floating window may be invalidated.

In invalidating the image portion, the image portion corresponding to the floating window position may be filled with a particular color. Here, the image portion corresponding to the floating window position may be filled with a color designated in the floating window information.

Alternatively, instead of filling the image portion corresponding to the floating window position directly with the color, an OSD image with respect to the image portion corresponding to the floating window position may be generated and overlap on the image portion, to thus invalidate the image portion.

In an exemplary embodiment of the present invention, in processing the floating window, a floating window may be set at an inner area of at least one of the left and right corners in each of the plurality of images according to position and size data, and an image portion corresponding to the floating window may be alpha-blended with color designated in the floating window information according to transparency data, to thereby suppress the image portion.

In a different exemplary embodiment of the present invention, the floating window information may include color and transparency data in addition to the size data regarding each floating window. Here, a floating window may be set at an inner side of at least one of the left and right corners in each of the plurality of images, and an image portion corresponding to the floating window position may be suppressed on the basis of the color and transparency data designated in the floating window information. In this case, the color may be alpha-blended on the image portion according to the transparency.

In an exemplary embodiment of the present invention, the suppressing of the image at the floating window position may be performed according to a user's manipulation command. For example, the floating window may be activated only when a user's manipulation command does not inhibit the asymmetrical suppressing. Also, the size of the floating window may be adjusted in response to a user's manipulation command.

According to the exemplary embodiments of the present invention, in order to implement a stereoscopic 3D image, an inner area of the left corner, the right corner, or both of the left and right corners in the left and right images is asymmetrically suppressed by using the floating window. Thus, a collision of cues, i.e., an edge violation problem, which may be generated when an object having a negative parallax value is partially covered (or occluded) can be prevented or reduced. Accordingly, an optical illusion effect in which an object having a negative parallax is reliably seen to be protruded to the front side of the display plane can be obtained. Thus, inconvenience and confusion caused by the edge violation can be reduced and a 3D effect and the sense of realism can be increased, thus improving the quality of a 3D image.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 shows an example of left and right images in order to illustrate a collision of a depth cue which potentially happens in the vicinity of left and right corners of the pair of stereoscopic images;

FIG. 10 shows the syntax of a floating window data;

FIG. 11 shows the syntax of an SEI RBSP payload bit stream suitable for transmitting floating window information in an embodiment in which a pair of stereoscopic images encoded according to the H.265/AVC standard;

FIGS. 15 to 21 are screen shots for explaining the process of synthesizing a floating window to left and right images, in which FIGS. 15 and 16 show left and right images before the synthesizing the floating window, FIGS. 17 an 18 show left and right images on which the floating window overlaps, and FIGS. 19 to 21 show examples of images displayed upon synthesizing the floating window-overlapping left and right images;

MODES FOR CARRYING OUT THE PREFERRED EMBODIMENTS

Reference will now be made in detail to exemplary embodiments of the present invention, examples of which are illustrated in the accompanying drawings.

Figure 1:
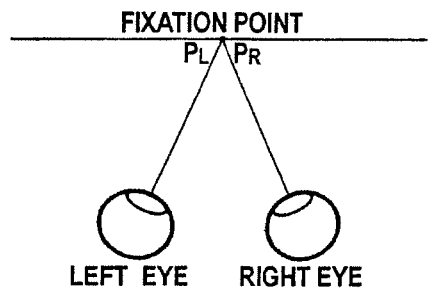
FIG. 1 shows a fixation point having a horizontal parallax of 0 in a stereoscopic 3D image.
Figure 2:
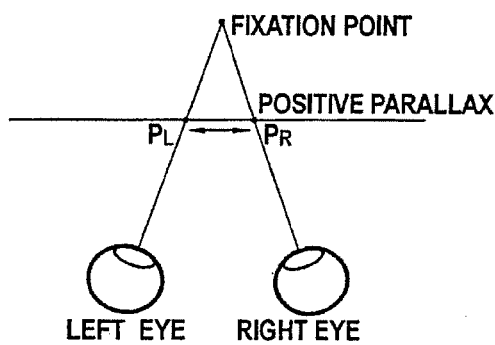
FIG. 2 shows a fixation point having a positive parallax value in the a stereoscopic 3D image.
Figure 3:
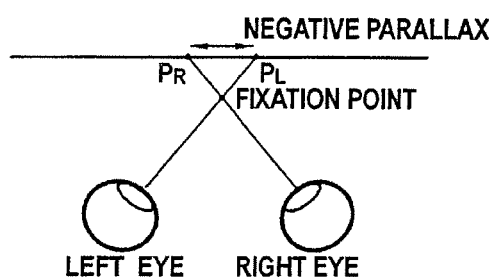
FIG. 3 shows a fixation point having a negative parallax value in the a stereoscopic 3D image.
Figure 4:
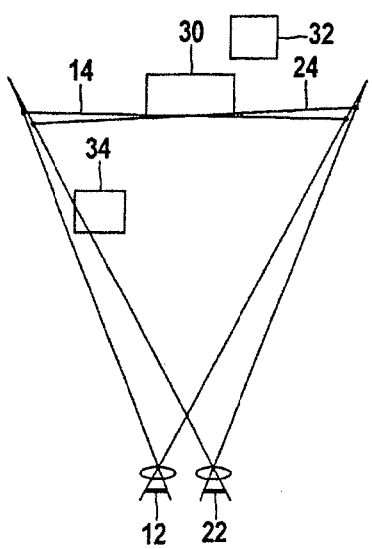
FIG. 4 shows an example of camera disposition for generating a pair of stereoscopic images.
Figure 6:
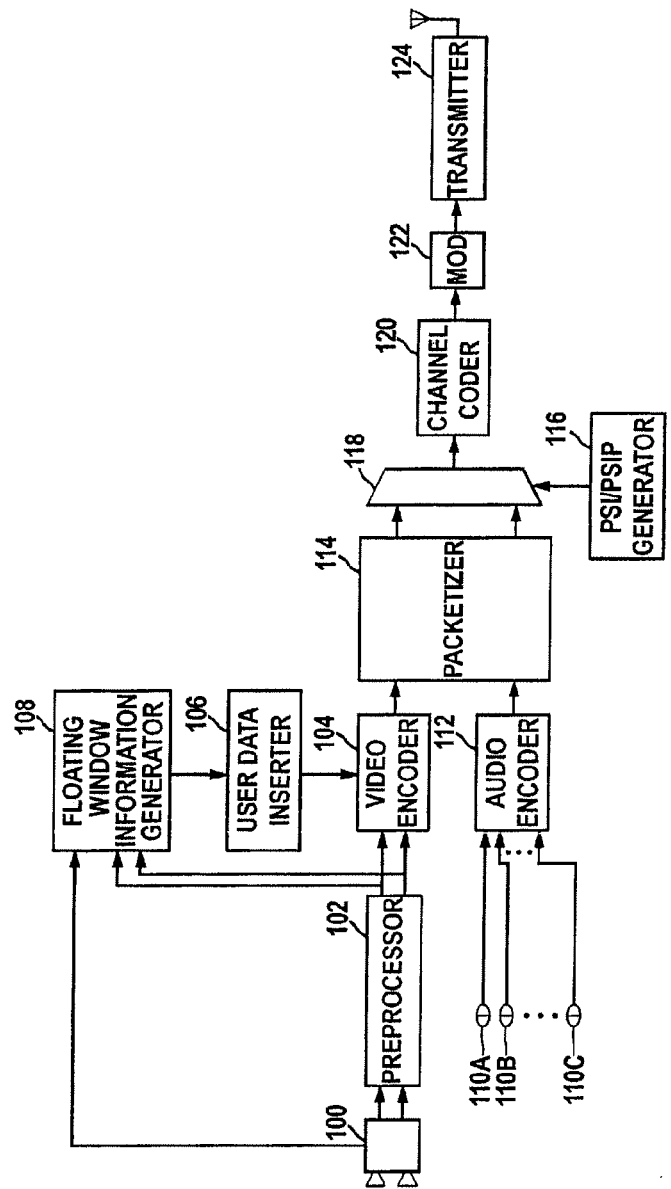
FIG. 6 is a schematic block diagram of a system for producing and creating a broadcast program according to an exemplary embodiment of the present invention.

With reference to FIG. 6, a system for producing and transmitting a broadcast program according to an exemplary embodiment of the present invention includes a binocular camera 100, a preprocessor 102, a video encoder 104, a user data inserter 106, a floating window information generator 108, a plurality of microphones 110a to 110f, an audio encoder 112, a packetizer 114, a transmission multiplexer 116, a PSI/PSIP generator 118, a channel coder 120, a modulator 122, and a transmitter 124.

The binocular camera 100 includes two lenses and image-pickup elements disposed to correspond to the lenses, and capture a pair of 2D images of a front scene. The two lenses are disposed to be separated by 65 millimeters from each other like human eyes, and accordingly, the camera obtains two 2D images having binocular disparity. Hereinafter, among the two 2D images constituting a pair of stereoscopic images, an image obtained by the left lens will be referred to as a left image, and an image obtained by the right lens will be referred to as a right image.

The preprocessor 102 cancels noise, which may be present in the original left and right images, calibrates (or corrects) the images, and solves an imbalancing phenomenon of luminance components. Images, which have been preprocessed by the preprocessing unit 104, may be stored in a storage unit or edited, and thus, as a matter of course, there may be a considerable time difference between the capturing by the camera and encoding by the video encoder 104.

In the present exemplary embodiment, the video encoder 104 removes temporal and spatial redundancy from the preprocessed left and right images, compresses the image signals, and generates a video elementary stream (ES) according to the MPEG-2 standard of ISO/IEC 13818-2 and the ATSC digital television standard. In an exemplary embodiment of the present invention, the video encoder 104 encodes an image used as a base view, e.g., the left image, among left and right images, on a frame basis according to the MPEG-2 standard. As for the right image, in order to reduce the amount of data by using the fact that a spatial correlation between the left and right images is very high, the video encoder 104 calculates a difference image between the left and right images, estimates motion vectors, and encodes the difference image and the motion vectors. However, the video encoder 104 may encode the right image in the same manner as that of the left image. Meanwhile, in a different exemplary embodiment, of course, the video encoder 104 may use other encoding schemes such as a pixel-based encoding scheme, a feature-based encoding scheme, an object-based encoding scheme, or the like, as well as the block-based encoding scheme. In particular, the video encoder 104 may encode a plurality of images according to the H.264/AVC standard drafted by the Joint Video Team (JVT) of ISO/IEC JTC1/SC29/WG11 and ITU-T SC16 Q.6.

According to the ATSC digital television standard of A/53 Part 4, extension data and user data may be inserted at a sequence level, at a GOP level, or at a picture level. When the video encoder 104 encodes the image signal, the user data inserter 106 provides extension data and user data to be inserted at the sequence level, the GOP level, or the picture level to the video encoder 104. In particular, according to the present exemplary embodiment, the user data inserter 106 provides floating window information from the floating window information generator 108 as a type of user data to the video encoder 104, such that user date inserter 106 includes the floating window information in the picture header, the video encoder 104 can encode the image signal.

Figure 7:
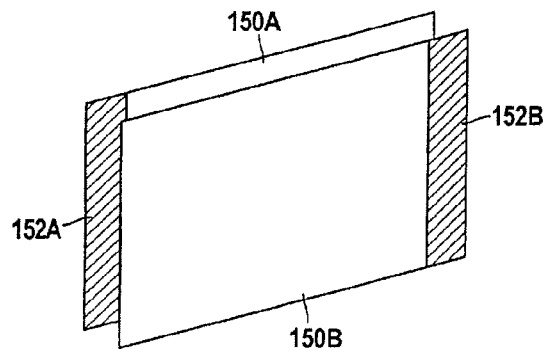
FIG. 7 shows a method for calculating the size of a floating window.

The floating window information generator 108 receives the left and right images, which have been calibrated by the preprocessor 102 and compares the left and right images to calculate the size of a floating window. As shown in FIG. 7, in the present exemplary embodiment, the floating window refers to a top-to-bottom strip area in a particular background color set to replace a portion of an image in the vicinity of the left corner of the left image or the right corner of the right image in order to reduce a collision between depth cues which may happen in the vicinity of the left and right corners when a receiver side displays a pair of stereoscopic images. Similarly, the floating window may also be formed at the right corner of the left image and the left corner of the right image. The floating window information generator 108 provides information regarding the size, i.e., the width, of each floating window and transparency and color information as floating window information to the video encoder 104 through the user data inserter 106.

Figure 8:
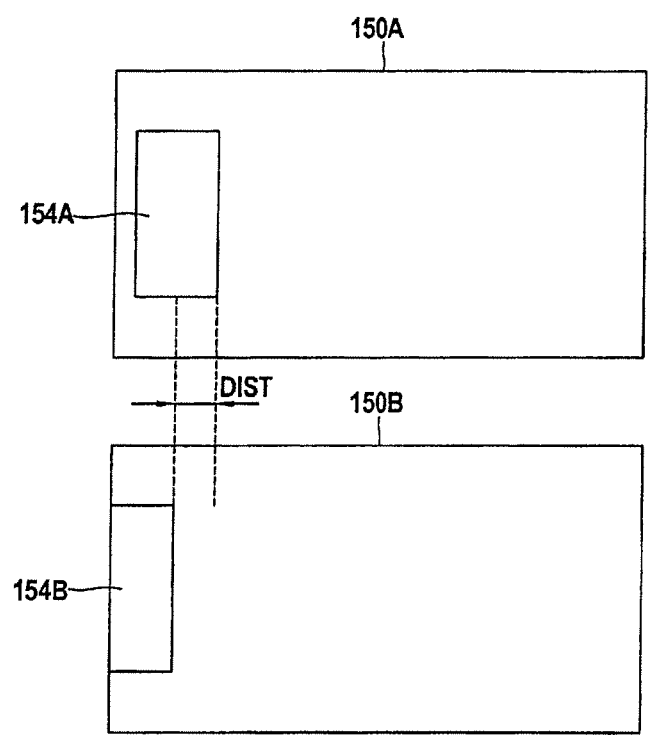
FIG. 8 shows an example of a floating window.

With reference to FIG. 8, in an exemplary embodiment, the floating window information generator 108 selects one object 154b from among the leftmost objects in a right image 150b, and searches for the position of a corresponding object 154a in a left image 150a. The floating window information generator 108 calculates the displacement, i.e., a position difference DIST, between the objects 154a and 154b, and determines the displacement as the width of a floating window. Whether to apply a floating window to the right image and the size of the floating window may be determined in the same manner as that of the floating window with respect to the left image.

The floating window information generator 108 may receive camera parameters such as a zoom, focal length, fixation angle, fixation point, lens distortion, and the like, from the camera 100, and adjust the size of the floating window in the left and right images on the basis of the parameters. For example, when the focal length of the camera 100 is longer than a certain reference, the floating window information generation unit 108 may reduce the width of the floating window, and when the focal length of the camera 100 is shorter than the reference, the floating window information generation unit 108 may increase the width of the floating window. In addition, whether to apply the floating window or an adjustment available range of the floating window may vary according to the attributes of a program image or the site where an image is captured (or image capturing site). Also, as a modification, a camera operator may directly determine whether to apply the floating window or an adjustment available range of the floating window or an editor may determine them in the process of editing an image. Of course, the operation of the camera operator or the editor may be performed according to a computer program.

With reference to FIG. 6, the plurality of microphones 110a to 110f installed at appropriate locations in the image capturing site obtain the sounds of the image capturing site and convert the obtained sounds into electrical audio signals. The audio encoder 112 encodes the audio signals received from the respective microphones 110a to 110f according to a certain standard, e.g., the AC-3 standard, to generate an audio elementary stream (ES).

The packetizer 114 receives the video ES and the audio ES from the video encoder 104 and the audio encoder 112, respectively, and packetizes the respective streams to generate packetized elementary streams. The PSI/PSIP generator 118 generates program specification information (PSI) and program and system information protocol (PSIP) information. The multiplexer 118 adds a header to the PES and PSI/PSIP information to generate a transport stream (TS). The system illustrated in FIG. 6 transmits one channel via, for example, ground waves, but in a system, which transmits a broadcast signal via a cable network or a satellite network, a transmission multiplexer may multiplex broadcast signals of a plurality of channels to generate multiple program TSs. The channel coder 120 performs error-correction-coding on the TS such that the receiver can detect and correct an error which may be caused by noise in the transport channel. The modulator 122 modulates the channel-coded TS according to a modulation scheme, e.g., an 8-VSB modulation scheme, adopted by the system. The transmitter 124 transmits the modulated broadcast signal according to channel characteristics, e.g., via an antenna 126.

The method for transmitting floating window information by the system of FIG. 6 will now be described in detail with reference to FIGS. 9 to 11. According to the MPEG-2 standard of ISO/IEC 13818-2 and the ATSC digital television standard of A/53 Part 4, an extension_and_user_data( ) structure for defining extension data or user data may be inserted into the header in the video sequence, GOP, or the picture level. In an exemplary embodiment of the present invention, the floating window information is included as picture user data in extension_and_user_data( ) which may be disposed to follow the picture header at the picture level, i.e., in the video ES.

Figure 9:
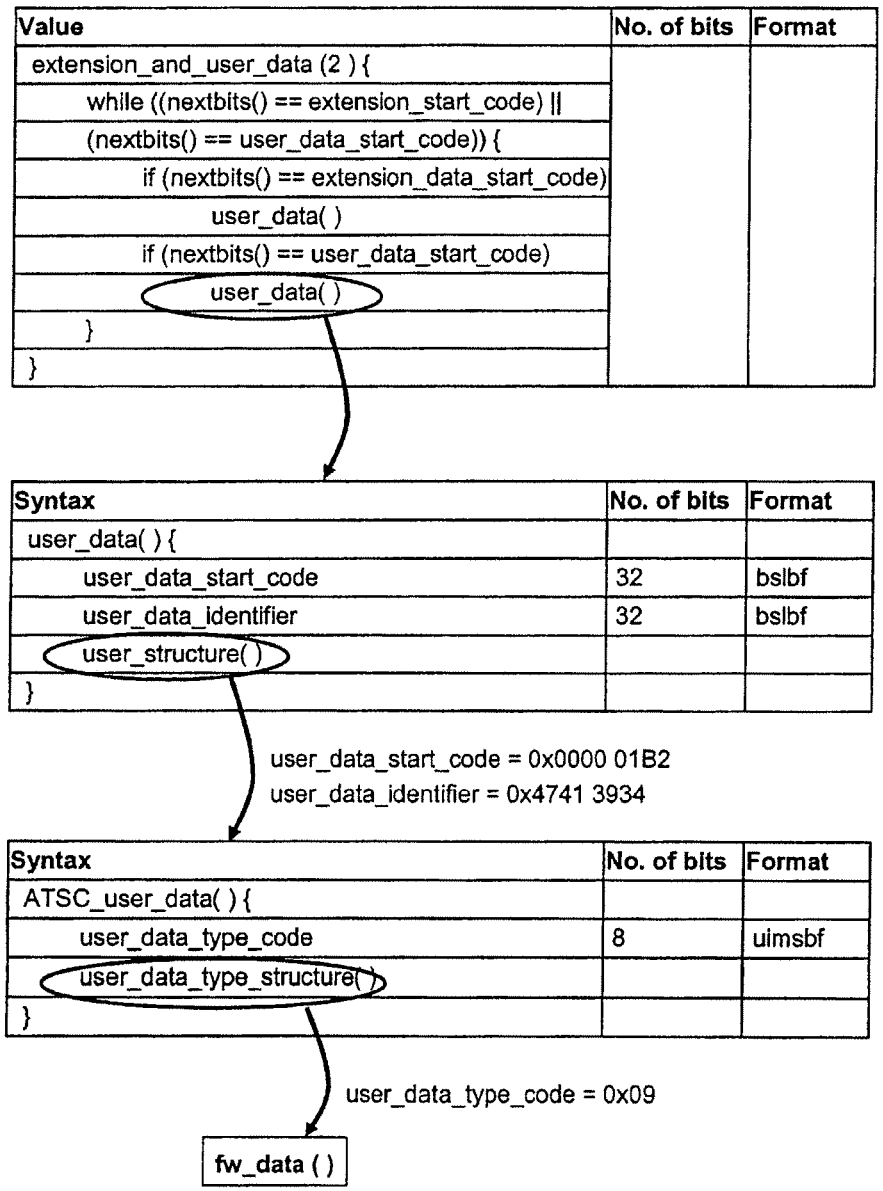
FIG. 9 shows the syntax of a user data bit stream transmitted according to an exemplary embodiment of the present invention.

A syntax of picture extension and user data is shown at an upper portion in FIG. 9. In extension_and_userdata(2) corresponding to the syntax title, number '2' in the parenthesis means that this syntax is at the picture level. As shown in the execution condition of the 'do while' portion, in the picture header, if the next appearing bits is extension_start_code or user_data_start_code, the bit streams thereunder have an extension_and_user_data(2) structure. Accordingly, the receiver recognizes the bit streams following extension_start_code or user_data_start_code as extension_data(2) or user_data( ) respectively.

As shown in the middle portion in FIG. 9, the picture user data user_data( ) includes 'user_data_start_code' and 'user_data_identifier' fields, and these fields is followed by user_structure( ). The value of 'user_data_start_code' is set to be "0x0000 01B2" according to ISO/IEC 13818-2. The 'user_data_identifier' field, a 32-bit code indicating the syntax and meaning of the user_structure( ) is determined by the value of 'format_identifier' according to the definition in the ISO/IEC 13818-1 standard. In case of ATSC_user_data( ) according to the present exemplary embodiment, the 'user_data_identifier' is determined as a value of "0x4741 3934".

The user_structure( ) is a variable field data structure defined by the 'user_data_identifier' field. As shown in FIG. 9, the user_structure( ) includes 'user_data_type_code' and user_data_type_structure( ). The. 'user_data_type_code' is a 8-bit value indicating the type of ATSC user data, and when it indicates floating window data, it is determined as a value of "0x09".

FIG. 10 shows the syntax of floating window data fw_data( ). The floating window data syntax includes four flags indicating the presence or absence of a floating window at the left corner and right corner in each of left and right images, the size of each flag-set window, transparency, and color information.

In FIG. 10, when 'left_view_left_float_window_flag' is set to be 1, it indicates that a left floating window exists in the left image. When 'left_view_right_float_window_flag' is set to be 1, it indicates that a right floating window exists in the left image. When 'right_view_left_float_window_flag' is set to be 1, it indicates that a left floating window exists in the right image. When 'right_view_right_float_window_flag' is set to be 1, it indicates that a right floating window exists in the right image.

A 'number_pixels_of_LL_window' field has a 14-bit integer value without a sign, and indicates the number or coordinates of the last luminance sample in the left floating window of the left image to indicate the width of the left floating window of the left image. A 'transparency_LL_window' field has a 24-bit integer value without a sign, and designates the transparency of the left floating window of the left image. A 'color_LL_window' field designates the color of the left floating window of the left image. The 'market bits' having a value of 11 indicates that information regarding each window starts. Meanwhile, the width data of the floating window can be directly indicated instead of the 'number_pixels_of_LL_window' field, and such is the same for other windows.

A 'number_pixels_of_LR_window' field has a 14-bit integer value without a sign, and indicates the number or coordinates of the first luminance sample in the right floating window of the left image to indicate the width of the right floating window of the left image. A 'transparency_LR_window' field has a 24-bit integer value without a sign and designates the transparency of the right floating window of the left image. A 'color_LR_window' field designates the color of the right floating window of the left image.

A 'number_pixels_of_RL_window' field has a 14-bit integer value without a sign, and indicates the number or coordinates of the last luminance sample in the left floating window of the right image to indicate the width of the left floating window of the right image. A 'transparency_RL_window' field has a 24-bit integer value without a sign and designates the transparency of the left floating window of the right image. A 'color_RL_window' field designates the color of the left floating window of the right image.

A 'number_pixels_of_RR_window' has a 14-bit integer value without a sign, and indicates the number or coordinates of the first luminance sample in the right floating window of the right image to indicate the width of the right floating window of the right image. A 'transparency_RR_window' field has a 24-bit integer value without a sign and designates the transparency of the right floating window of the right image. A 'color_RR_window' field designates the color of the right floating window of the right image.

As described above, according to an exemplary embodiment of the present invention, the two 2D images constituting a pair of stereoscopic images are encoded according to the MPEG-2 standard, and the floating window information is included as user data in the picture header of the video ES. However, as mentioned above, the left and right images may be encoded according to a different encoding scheme, e.g., the H.265/AVC standard drafted by the Joint Video Team (JVT) of ISO/IEC JTC1/SC29/WG11 and ITU-T SG16 Q.6. When the left and right images are encoded according to the H.264/AVC standard, the floating window information may be included in an SEI (Supplemental Enhancement Information) area and transmitted.

FIG. 11 is a view illustrating the syntax of an SEI RBSP payload bit stream suitable for transmitting floating window information in a modification in which a pair of stereoscopic images is encoded according to the H.265/AVC standard. In the syntax illustrated in FIG. 11, 'itu_t_t35_country_code' is an 8-bit country code defined in Annex A of ITU-T T35, and in case of Korea, it has a value of "0x61". 'itu_t_t35_provider_code' is a 16-bit code having a value of "0x0031". 'user_identifier' is a 32-bit code and may indicate that the syntax structure of user_structure( ) is defined by ATSC A/53 by sing a value of "0x4741 3934". In this case, user_structure( ) may be used in the same manner as defined in the ATSC digital television standard, namely, as defined in A/53 Part 4 Section 6.2.3. Thus, the floating window information may be displayed according to the user data syntax at a lower portion in FIG. 9 and the floating window data syntax in FIG. 10.

Figure 12:
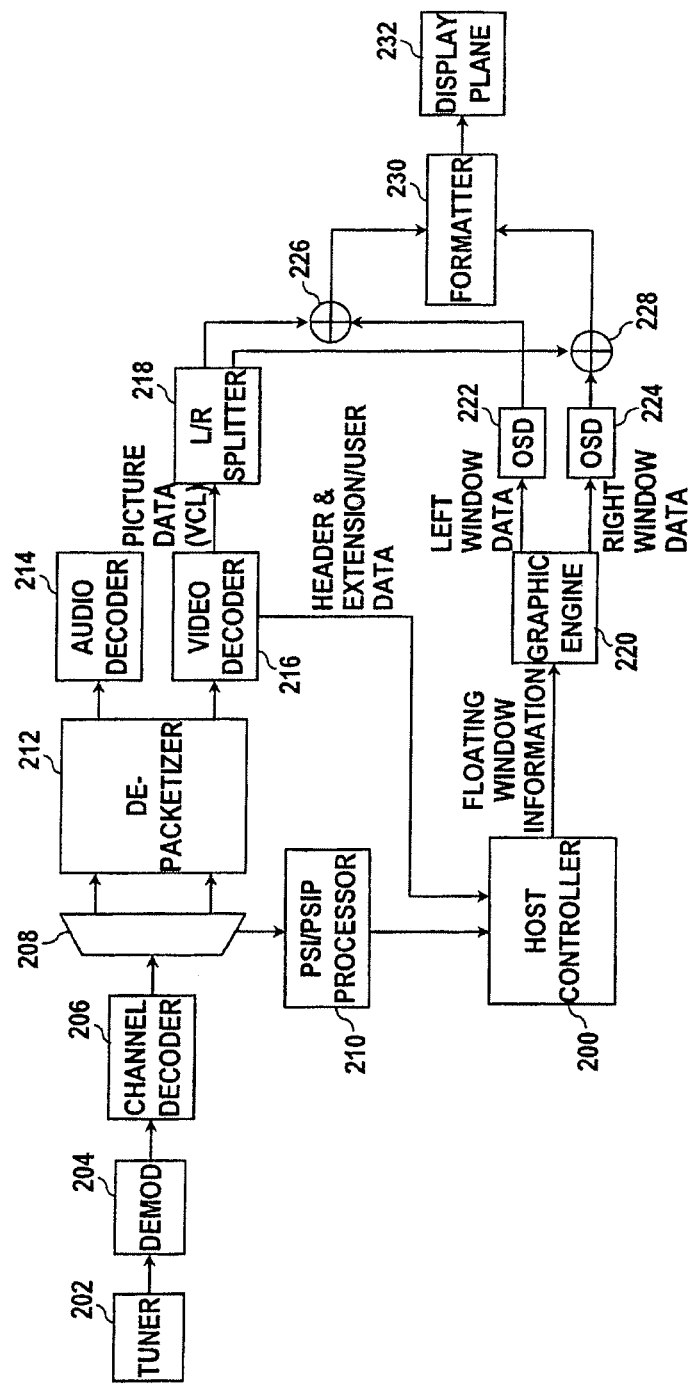
FIG. 12 is a schematic block diagram of a television receiver according to an exemplary embodiment of the present invention.

FIG. 12 is a schematic block diagram of a television receiver according to an exemplary embodiment of the present invention. The television receiver according to the present exemplary embodiment is adapted to receive over-the-air (OTA) broadcast signals and to reproduce images.

A tuner 202 selects a broadcast signal of any one channel selected by the user from among a plurality of broadcast signals received via an antenna, and outputs the selected broadcast signal. A demodulator 204 demodulates the broadcast signal from the tuner 202 and outputs a demodulated transport stream. A channel decoder 206 performs error-correction coding on the demodulated signal. A demultiplexer 208 demultiplexes the error-correction-decoded TS to separate a video PES and an audio PES, and extracts PSI/PSIP information. A PSI/PSIP processor 210 stores the PSI/PSIP information to a memory (not shown) or provides it to a host controller 200 to allow a broadcast to be reproduced according to the PSI/PSIP information. A depacketizer 212 depacketizes the video PES and the audio PES to restore the video ES and the audio ES. An audio decoder 214 decodes the audio ES and outputs an audio bit stream. The audio bit stream is converted into an analog audio signal by a digital-to-analog converter (not shown), amplified by an amplifier (not shown), and then output via a speaker (not shown).

A video decoder 216 decodes the video ES and outputs a video bit stream, i.e., picture data. A left/right splitter 218 splits the left image signal and the right image signal from the picture data. Meanwhile, in the decoding process, the video decoder 216 extracts the header and extension/user data from the video ES and provides it to the host controller 200, to allow the host controller 200 to extract the floating window data fw_data( ) from the extracted head and extension/user data and restore the floating window information.

The host controller 200 determines whether or not a left or right floating window exists in the left and right images on the basis of four flags, namely, 'left_view_left_float_window_flag', 'left_view_right_float_window_flag', 'right_view_left_float_window_flag', and 'right_view_right_float_window_flag' in the floating window data. And, the host controller 200 checks the size, i.e., the width, of the floating window through the fields of 'number_pixels_of_LL_window', 'number_pixels_of_LR_window', 'number_pixels_of_RL_window', and 'number_pixels_of_RR_window' with respect to the floating window in which a flat is set to be 1. Also, the host controller 200 checks the color to be used in outputting each floating window on the basis of the fields of 'color_LL_window', 'color_LR_window', 'color_RL_window', and 'color_RR_window'. Also, the host controller 200 checks an alpha-blending value with respect to each floating window on the basis of the fields of 'transparency_LL_window', 'transparency_LR_window', 'transparency_RL_window', 'transparency_RR_window'. The host controller 200, providing the floating window information in an appropriate form to a graphic engine 220, controls the graphic engine 220, first and second OSD generators 222 and 224, first and second mixers 226 and 228 and a formatter 230 to allow for image processing according to the floating window information. The graphic engine 220 receives the floating window information such as the window size, transparency, color, and the like, in an appropriate form, and generates OSD data with respect to the floating window in the left and right images on the basis of the floating window information.

The first OSD generator 222 generates an OSD signal with respect to the left image on the basis of the OSD data with respect to the left image floating window. The first mixer 226 mixes the left image OSD signal from the first OSD generator 222 in the left image signal from the left/right image splitter 218 to replace the left image with the left image OSD signal in the floating window area with respect to the left image or alpha-blend the left OSD signal in the left image signal. Meanwhile, the second OSD generator 224 generates an OSD signal with respect to the right image on the basis of the OSD data with respect to the right image floating window. The second mixer 228 mixes the right image OSD signal from the second OSD generator 224 in the right image signal from the left/right image splitter 218 to replace the left image with the left image OSD signal in the floating window area with respect to the left image or alpha-blend the left OSD signal in the left image signal. The formatter 230 compares the frame time with respect to the left and right image signals having the OSD overlapped thereon, and performs formatting to display on the display plane 232 a pair of left and right images that temporally match each other, to thus restore the 3D images.

Meanwhile, synthesizing of images by the first and second mixers 226 and 228 may be selectively performed in response to a user command. Namely, a viewer may apply a manipulation command such that the floating window cannot be applied by manipulating a remote controller (not shown). When such a manipulation command is applied, the host controller 200 may store the command in a memory and control synthesizing of the floating window with reference to the command. Also, the generating of the floating window by the graphic engine 220 may be deformed according to a user manipulation command. For example, the user may apply a command for reducing the window of each floating window within the range of the window size designated in the floating window information received through the broadcast signal, and accordingly, the host controller 200 provides the floating window information having the adjusted size of the floating window to the graphic engine 220.

The process of extracting and displaying the floating window information will now be described in more detail with reference to FIGS. 13 to 21.

Figure 13:
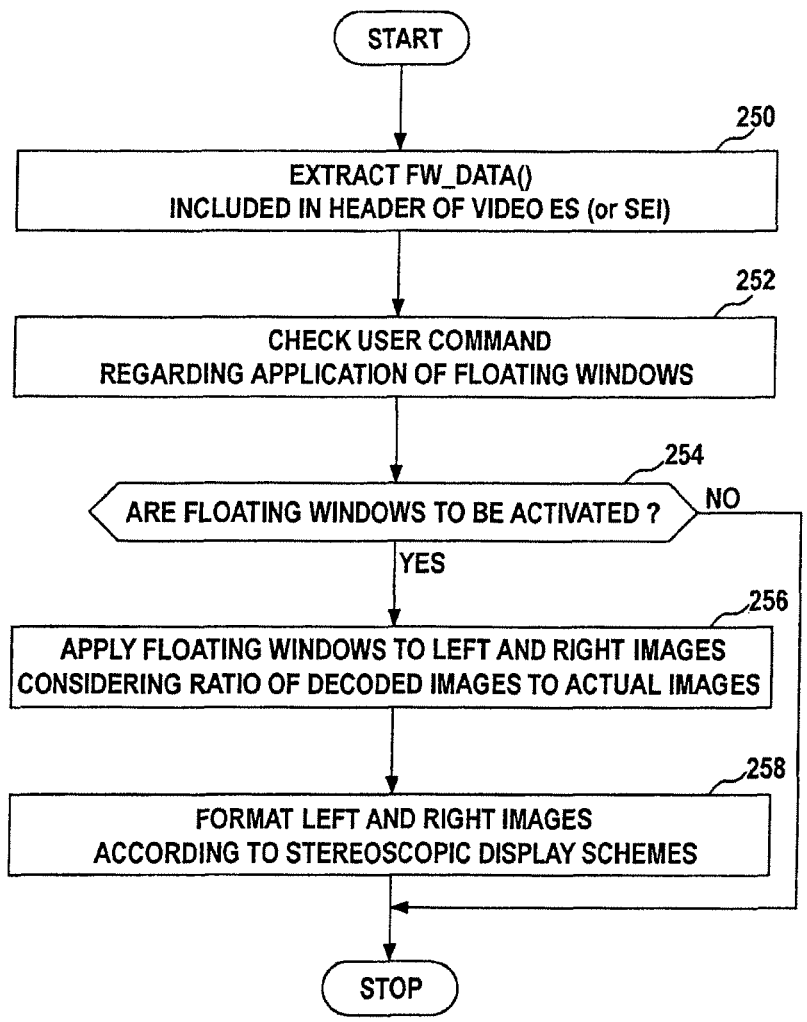
FIG. 13 is a flow chart illustrating the process of extracting floating window information and synthesizing it to left and right images in the television receiver according to an exemplary embodiment of the present invention.

FIG. 13 shows the process of extracting the floating window information and synthesizing it with the left and right images. First, the host controller 200 extracts the floating window data fw_data( ) from the header and extension/user data extracted by the video decoder 216 in the process of decoding the video ES (step S250). Here, as mentioned above, when the video ES has been encoded according to the H.264/AVC standard, the floating window data may be extracted from the SEI (Supplemental Enhancement Information).

Whether to apply the floating window invalidating a portion of the left image or the right image according to the present exemplary embodiment may be determined in response to a user manipulation command. Thus, the host controller 200 may continuously checks whether or not a manipulation command with respect to the application of the floating window is applied from the remote controller (not shown). When the command is applied, the host controller 200 stores the applied command in the memory and controls synthesizing of the floating window. In step S252, the host controller 200 checks whether or not a user command with respect to the manipulation of the floating window has been stored in the memory, or whether or not a manipulation command with respect to the application of the floating window has been applied from the remote controller. In step S254, the host controller 200 determines whether or not the floating window is to be activated.

When it is determined that the floating window is to be activated in step S254, the host controller 200 controls the graphic engine 220, the first and second OSD generators 222 and 224, and the first and second mixers 226 and 228 to apply the floating window to the left and right images (step S256). Subsequently, the formatter 230 formats the OSD-overlapping left and right images according to the stereoscopic display scheme of the corresponding receiver to allow for displaying of a 3D image (step S258).

Figure 14:
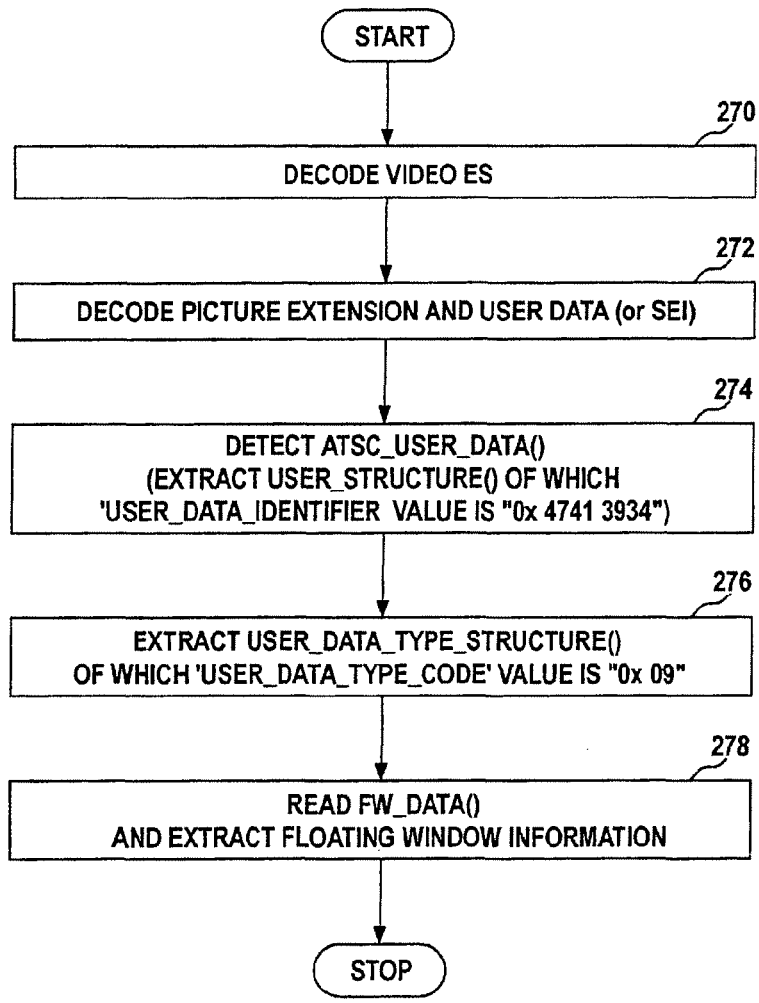
FIG. 14 is a flow chart illustrating the process of extracting floating window information in FIG. 12.

FIG. 14 is a flow chart illustrating the process (step S250) of extracting the floating window information. The video decoder 216 decodes the video ES to output picture data or a video coding layer (VCL), extract the header and extension/user data from the video ES (step S270), and the host controller 200 decodes extension_and_user_data(2) and extracts picture user data user_data( ) (step S272). Meanwhile, In a modification in which the video ES has been encoded according to an H.264/AVC standard, an SEI (Supplemental Enhancement Information) are is decoded. In detail, the host controller 200 parses an AVC NAL unit to extract SEI data having a 'nal_unit_type' value as 6, and reads a user_data_registered_itu_t_t35( ) message having a 'payloadType' value as 4.

In step S274, the host controller 200 detects ATSC_user_data( ) having a 'user_data_identifier' value as "0x4741 3934" from the picture user data user_data( ). Thereafter, the host controller 200 detects user_data_type_structure( ) having 'user_data_type_code' as "0x09" from ATSC_user_data( ) (step S276). Finally, the host controller 200 reads floating window data fw_data( ) from the user_data_type_structure( ) to extract information such as the size, transparency, color, or the like, with respect to each window set to have a flag indicating the presence of a floating window (step S278).

Figure 15:
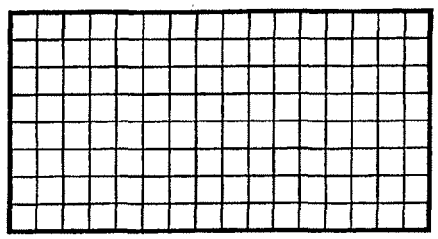
Figure 16:
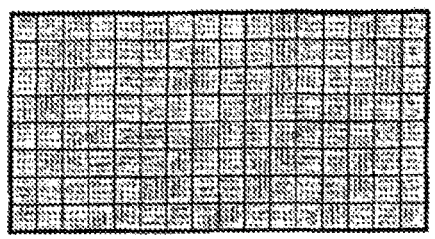

FIGS. 15 to 21 are screen shots for explaining the process of synthesizing a floating window to left and right images. Here, it is assumed that the left and right images before the floating window synthesizing are as shown in FIGS. 15 and 16 and the floating window information is as follows.

'left_view_left_float_window_flag'="1"
'left_view_right_float_window_flag'="0"
'right_view_left_float_window_flag'="0"
'right_view_right_float_window_flag'="1"
'number_pixels_of_LL_window'="2"
'transparency_LL_window'="0"
'color_LL_window'="0x 505050"
'number_pixels_of_LR_window'="2"
'number_pixels_of_RL_window'="2"
'number_pixels_of_RR_window'="3"
'transparency_RR_window'="0"
'color_RR_window'="0x 000000"

In this example, since 'left_view_left_float_window_flag' and 'left_view_right_float_window_flag' are set to be 1, the host controller 200 determines that the left floating window with respect to the left image and the right floating window with respect to the right image must be activated. Meanwhile, since 'right_view_left_float_window_flag' and 'right_view_right_float_window_flag' are set to be 0, the host controller 200 determines that the right floating window with respect to the left image and the left floating window with respect to the right image must not be activated.

The graphic engine 220 generates OSD data with respect to the floating window in the left image on the basis of width and color of the floating window and the transparency value for alpha-blending through 'number_pixels_of_LL_window', 'transparency_LL_window', and 'color_LL_window' fields. Also, the graphic engine 220 generates OSD data with respect to the floating window in the left image on the basis of the width and color of the floating window and the transparency value for alpha-blending through the 'number_pixels_of_RR_window', 'transparency_RR_window', and 'color_RR_window'.

Accordingly, the left floating window with respect to the left image has a vertical strip form in which the width is 2 pixels, the transparent is 0, and the color is "0x 505050". Also, the right floating window with respect to the right image has a vertical strip form in which the width is 3 pixels, the transparency is 0, and the color is "0x 000000".

Figure 17:
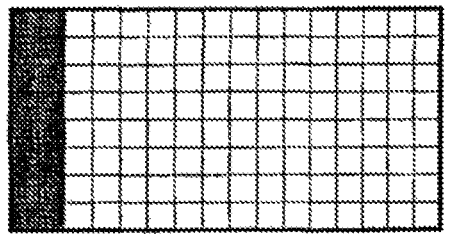
Figure 18:
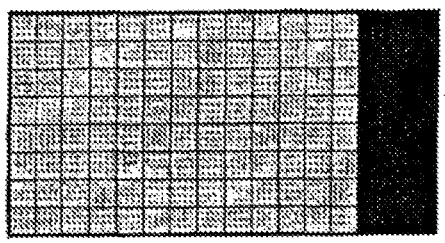

The first mixer 226 overlays the OSD image on the left image of FIG. 15 to generate a left image signal indicating a left image with the floating window overlaid thereon a shown in FIG. 17. The second mixer 228 overlays the OSD image of FIG. 18 on the right image of FIG. 16 to generate a right image signal indicating a right image with the floating window overlaid thereon as shown in FIG. 18.

Figure 19:
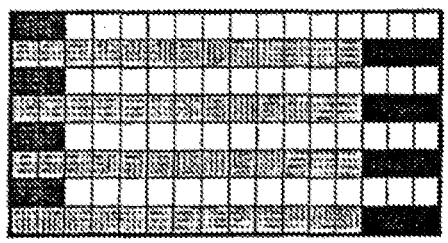
Figure 20:
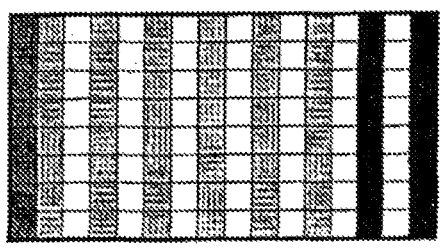
Figure 21:
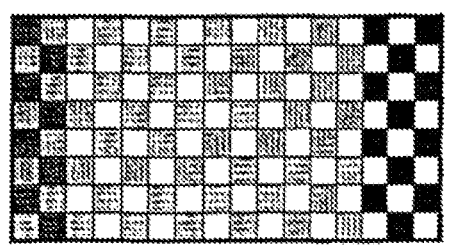

The formatter 230 synthesizes the left and right images with the OSD image overlaid thereon. FIGS. 19 to 21 show examples of screen images displayed after synthesizing the left and right images with the floating windows overlaid thereon. In more detail, FIG. 19 shows an example of synthesizing the left and right images in a horizontal interleaving manner, in which the left and right images are alternately displayed by changing the horizontal rows one by one. FIG. 20 shows an example of synthesizing the left and right images in a vertical interleaving manner, in which the left and right images are alternately displayed by changing the vertical rows one by one. FIG. 21 shows an example of synthesizing the left and right images in a checkerboard pattern. As illustrated, in the screen areas in which the floating windows are sets, the left or right image replaced by the floating window is not displayed and only the left or right image not affected by the floating window is displayed. The displayed left and right images are input to the viewer's left and right eyes through polarized glasses, respectively.

In this manner, the synthesis examples illustrated in FIGS. 19 to 21 are suitable for the receiver system using the polarized glasses. However, in a modification, the present invention can be applicable to a receiver system using shutter glasses. In the receiver system using shutter glasses, the images of FIGS. 17 and 18 may be alternately displayed on the display plane. The shutter glasses synchronized to switching of the displayed image may deliver the left and right images only to the viewer's left and right eyes, respectively.

Figure 22:
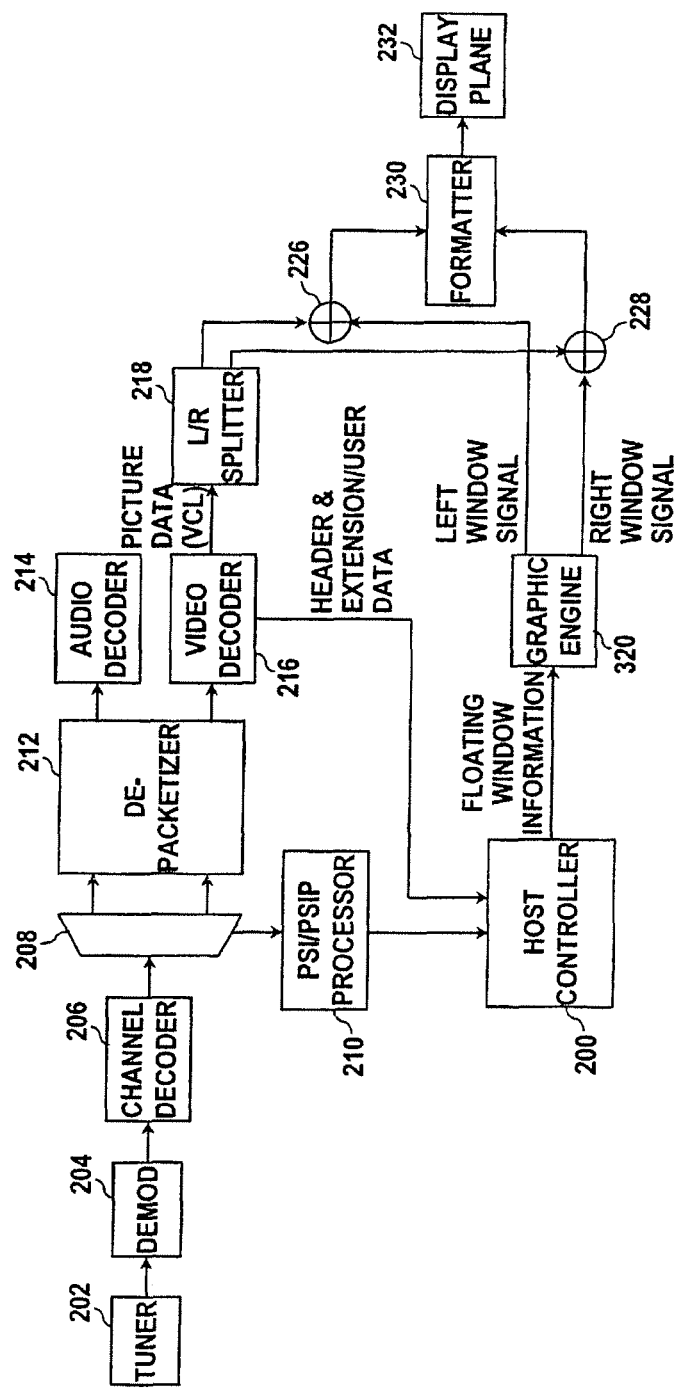
FIG. 22 is a schematic block diagram of a television receiver according to another exemplary embodiment of the present invention.

In the foregoing embodiment, the graphic engine 220 generates the OSD data with respect to the floating window on the basis of the floating window information, and the first and second OSD generators 222 and 224 generate the OSD image signals, but in a modification, the graphic engine 220 and the first and second OSD generators 222 and 224 may be integrated. FIG. 22 shows an example of the modification. In FIG. 22, the graphic engine 220 receives the floating window information in an appropriate form from the host controller 220, generates an OSD signal for implementing left and right floating windows on the basis of the information, and outputs the generated OSD signal to the first and second mixers 226 and 228. Other characteristics of the present exemplary embodiment are similar to those of FIG. 12, so a detailed description thereof will be omitted.

Figure 23:
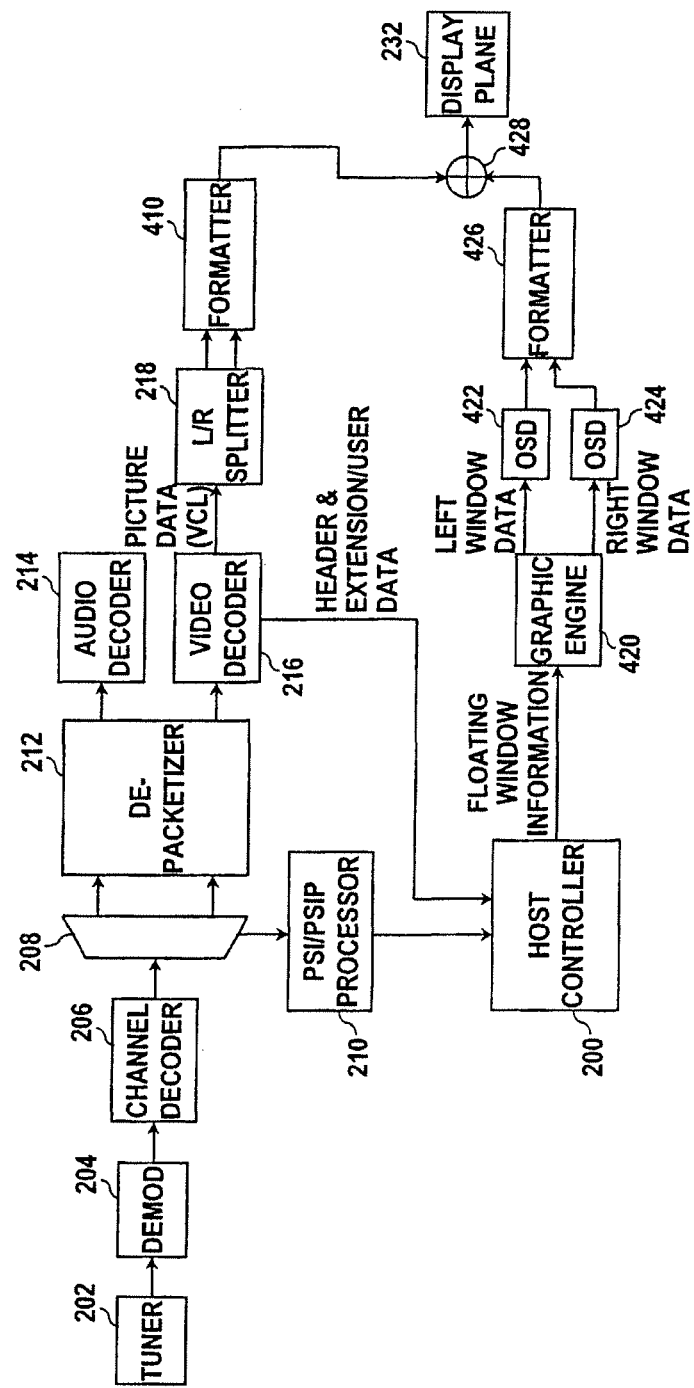
FIG. 23 is a schematic block diagram of a television receiver according to another exemplary embodiment of the present invention.

FIG. 23 shows a modification of a television receiver according to an exemplary embodiment of the present invention. In this embodiment, broadcast payload data, namely, left and right picture data or video coding layer (VCL) is formatted by a single formatter, left and right OSD signals are formatted by another formatter, and the formatted signals are mixed. A first formatter 410 formats left and right image signals from the left/right splitter 218 according to a stereoscopic output scheme. A graphic engine 420 receives the floating window information from the host controller 200 in an appropriated form, and generates OSD data with respect to the floating window in the left and right images. A first OSD generator 422 generates an OSD signal with respect to a left image on the basis of the OSD data with respect to the left image floating window. A second OSD generator 424 generates an OSD signal with respect to a right image on the basis of the OSD data with respect to the right image floating window. A second formatter 426 formats the left image OSD signal and the right image OSD signal according to the stereoscopic output scheme. A mixer 428 synthesizes output signals from the first and second formatters 410 and 426 to allow the synthesized image signals to be displayed on the display plane 232.

Meanwhile, in the foregoing embodiment, the OSD images are generated on the basis of the floating window information and the generated OSD images are synthesized to the broadcast images, but as a modification, broadcast images may be directly manipulated correspondingly according to the floating window information.

Besides, the present invention may be variably modified or implemented to any other specific forms without altering the technical concept or essential characteristics of the present invention.

For example, in the above description, the broadcast image portion corresponding to the position of the floating window is replaced by the color designated in the floating window information so as to be erased or invalidated, but as a modification, the broadcast image portion corresponding to the position of the floating window may be suppressed by alpha-blending according to the transparency of the floating window, rather than being completely invalidated.

Meanwhile, in the above description, the present invention is based on the over-the-air (OTA) digital broadcast, but the present invention may be applicable in the same manner to a broadcast transmitted through a cable network. Also, the present invention may be applicable in the same manner to storing of an image through a storage medium such as a DVD, a Blu-ray™ disk, or the like, or reproducing of the stored image. In addition, the present invention may be applicable to a video transmission in a network.

As described above, the inner area of the left corner, right corner, or the both corners of each of the left and right images are asymmetrically suppressed by a floating window in order to implement a stereoscopic 3D image. Thus, the collision of cues, i.e., an edge violation problem, which may be generated when an object having a negative parallax value is partially covered (or occluded) can be prevented or reduced. Accordingly, an optical illusion effect in which an object having a negative parallax is reliably seen to be protruded to the front side of the display plane can be obtained. Thus, inconvenience and confusion caused by the edge violation can be reduced and a 3D effect and the sense of realism can be increased, thus improving the quality of a 3D image.

The present invention can be applicable in a similar manner even to a multi-view 3D TV, as well as to a stereoscopic 3D TV. Also, the present invention can be applicable to any other 3D TVs as well as lenticular, integral imaging, or holography scheme.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:
1. A method comprising:
receiving, by a tuner, encoded video signals containing a plurality of video streams based on respectively different image viewpoints that support stereoscopic or 3D digital video images;
decoding, by a video decoder, the received video signals and identifying a first parameter and a second parameter from the decoded video signals to be used in addressing potential stereoscopic window violations with respect to displaying of stereoscopic or 3D digital video images; and
processing, by a controller, the decoded video signals using the identified first and second parameters to support the displaying of stereoscopic or 3D digital video images with minimal stereoscopic window violations,
wherein the stereoscopic window violations are suppressed by using floating window information, which includes a size of the floating window, added into a header extension for a video elementary stream (ES) among the plurality of video streams,
wherein the size of the floating window is determined based on a position difference between an object in a right image and a corresponding object included in a left image, and wherein the header extension includes at least one field indicating the number or coordinates of a first luminance sample and a last luminance sample to identify the size of the floating window.

2. The method of claim 1, wherein the first parameter is a user data identifier and the second parameter is a user data type code.

3. The method of claim 2, wherein the user data identifier has a value of 0x47413934 and the user data type code has a value of 0x09, whereby both values indicate the floating window information.

4. The method of claim 1, wherein the floating window information relates to image processing of at least one of a left edge of a left image/view, a right edge of a left image/view, a left edge of a right image/view, and a right edge of a right image/view of the stereoscopic or 3D digital video images.

5. The method of claim 1, wherein at least one of the steps of receiving, decoding and processing comply with at least one of ATSC technology, MPEG-2 technology, AVC technology, 3D television technology, multi-view 3D television technology, and 3D technologies using lenticular, integral imaging, or holography techniques.

6. A method comprising:
encoding, by a video encoder, video signals containing a plurality of video streams based on respectively different image viewpoints that support stereoscopic or 3D digital video images,
said encoded video signals comprising a first parameter and a second parameter to be used in addressing potential stereoscopic window violations with respect to displaying of stereoscopic or 3D digital video images; and
transmitting, by a transmitter to a receiver, the encoded video signals to be decoded at the receiver using the first and second parameters identified from the decoded video signals to support the displaying of stereoscopic or 3D digital video images with minimal stereoscopic window violations,
wherein the stereoscopic window violations are suppressed by using floating window information, which includes a size of the floating window, added into a header extension for a video elementary stream (ES) among the plurality of video streams,
wherein the size of the floating window is determined based on a position difference between an object in a right image and a corresponding object included in a left image, and
wherein the header extension includes at least one field indicating the number or coordinates of a first luminance sample and a last luminance sample to identify the size of the floating window.

7. The method of claim 6, wherein the first parameter is a user data identifier and the second parameter is a user data type code, whereby the user data identifier has a value of 0x47413934 and the user data type code has a value of 0x09, whereby both values indicate the floating window information.

8. The method of claim 6, wherein the floating window information relates to image processing of at least one of a left edge of a left image/view, a right edge of a left image/view, a left edge of a right image/view, and a right edge of a right image/view of the stereoscopic or 3D digital video images.

9. The method of claim 6, wherein at least one of the steps of encoding and transmitting comply with at least one of ATSC technology, MPEG-2 technology, AVC technology, 3D television technology, multi-view 3D television technology, and 3D technologies using lenticular, integral imaging, or holography techniques.

10. An apparatus comprising:
a tuner for receiving encoded video signals containing a plurality of video streams based on respectively different image viewpoints that support stereoscopic or 3D digital video broadcasting services;
a video decoder for decoding the received video signals and identifying a first parameter and a second parameter from the decoded video signals to be used in addressing potential stereoscopic window violations with respect to displaying of stereoscopic or 3D digital video images; and
a controller for processing the decoded video signals using the identified first and second parameters to support the displaying of stereoscopic or 3D digital video images with minimal stereoscopic window violations,
wherein the stereoscopic window violations are suppressed by using floating window information, which includes a size of the floating window, added into a header extension for a video elementary stream (ES) among the plurality of video streams,
wherein the size of the floating window is determined based on a position difference between an object in a right image and a corresponding object included in a left image, and
wherein the header extension includes at least one field indicating the number or coordinates of a first luminance sample and a last luminance sample to identify the size of the floating window.

11. The apparatus of claim 10, wherein the first parameter is a user data identifier and the second parameter is a user data type code, whereby the user data identifier has a value of 0x47413934 and the user data type code has a value of 0x09, whereby both values indicate the floating window information,
wherein the floating window information relates to image processing of at least one of a left edge of a left image/view, a right edge of a left image/view, a left edge of a right image/view, and a right edge of a right image/view of the stereoscopic or 3D digital video images, and
wherein at least one of the means adapted for receiving, the means adapted for decoding and the means adapted for processing comply with at least one of ATSC technology, MPEG-2 technology, AVC technology, 3D television technology, multi-view 3D television technology, and 3D technologies using lenticular, integral imaging, or holography techniques.

12. An apparatus comprising:
a video encoder for encoding video signals containing a plurality of video streams based on respectively different image viewpoints that support stereoscopic or 3D digital video images,
said encoded video signals comprising a first parameter and a second parameter to be used in addressing potential stereoscopic window violations with respect to displaying of stereoscopic or 3D digital video images; and
a transmitter for transmitting, to a receiver, the encoded video signals to be decoded at the receiver using the first and second parameters identified from the decoded video signals to support the displaying of stereoscopic or 3D digital video images with minimal stereoscopic window violations,
wherein the stereoscopic window violations are suppressed by using floating window information, which includes a size of the floating window, added into a header extension for a video elementary stream (ES) among the plurality of video streams, wherein the size of the floating window is determined based on a position difference between an object in a right image and a corresponding object included in a left image, and wherein the header extension includes at least one field indicating the number or coordinates of a first luminance sample and a last luminance sample to identify the size of the floating window.

13. The apparatus of claim 12, wherein the first parameter is a user data identifier and the second parameter is a user data type code, whereby the user data identifier has a value of 0x47413934 and the user data type code has a value of 0x09, whereby both values indicate the floating window information, wherein the floating window information relates to image processing of at least one of a left edge of a left image/view, a right edge of a left image/view, a left edge of a right image/view, and a right edge of a right image/view of the stereoscopic or 3D digital video images, and wherein at least one of the means adapted for encoding and the means adapted for transmitting comply with at least one of ATSC technology, MPEG-2 technology, AVC technology, 3D television technology, multi-view 3D television technology, and 3D technologies using lenticular, integral imaging, or holography techniques.

* * * * *